United States Patent
Bukkems (10) Patent No.: US 9,178,331 B2
(45) Date of Patent: Nov. 3, 2015

(54) MICRO-INTEGRATABLE TUNABLE LASER ASSEMBLY

(71) Applicant: Heino Bukkems, San Jose, CA (US)

(72) Inventor: Heino Bukkems, San Jose, CA (US)

( * ) Notice: Subject to any disclaimer, the term of this patent is extended or adjusted under 35 U.S.C. 154(b) by 0 days.

(21) Appl. No.: 13/901,257

(22) Filed: May 23, 2013

(65) Prior Publication Data

US 2015/0078408 A1  Mar. 19, 2015

(51) Int. Cl.
*H01S 3/10* (2006.01)

(52) U.S. Cl.
CPC .................................. *H01S 3/1003* (2013.01)

(58) Field of Classification Search
CPC . H01S 5/02284; H01S 5/0683; H01S 5/0064; H01S 5/02248; H01S 5/02438; H01S 5/141; H01S 5/02415; H01S 5/005; H01S 3/10
USPC .............................................. 371/20; 372/20
See application file for complete search history.

(56) References Cited

U.S. PATENT DOCUMENTS

| | | | |
|---|---|---|---|
| D396,817 S | 8/1998 | Webb | |
| 6,318,909 B1 * | 11/2001 | Giboney et al. | 385/90 |
| D457,446 S | 5/2002 | Kallabis | |
| D461,135 S | 8/2002 | Watson et al. | |
| 6,577,388 B2 | 6/2003 | Kallabis | |
| 6,763,596 B1 | 7/2004 | Puri et al. | |
| 7,621,747 B1 | 11/2009 | Burrow | |
| 7,720,122 B2 | 5/2010 | Matsushita et al. | |
| 7,886,450 B1 | 2/2011 | Fiano | |
| D646,992 S | 10/2011 | Tuli | |
| 8,061,046 B2 | 11/2011 | Stefan et al. | |
| D668,976 S | 10/2012 | Stilz | |
| 8,467,036 B2 | 6/2013 | Gogolla et al. | |
| D692,327 S | 10/2013 | Asher et al. | |
| 2001/0025922 A1 | 10/2001 | Lautenschlager et al. | |
| 2005/0141574 A1 | 6/2005 | Sakano et al. | |
| 2005/0286581 A1 | 12/2005 | Shinohara et al. | |
| 2013/0177034 A1 | 7/2013 | Liu et al. | |

OTHER PUBLICATIONS

Koji Horikawa, "Development of ITLA Using a Full-Band Tunable Laser", http://www.furukawa.co.jp/review/fr035/fr35_01.pdf, Furukawa Review, No. 35 2009, cannot import to OACS because the file is protected.*
Integrable Tunable Laser Assembly MSA, OIF-ITLA-MSA-01.2, Jun. 26, 2008.*
Micro Integrable Tunable Laser Assembly Implementation Agreement, OIF-MicroITLA-01.0, Sep. 20, 2011.*

* cited by examiner

*Primary Examiner* — Xinning Niu
*Assistant Examiner* — Vu A Vu
(74) *Attorney, Agent, or Firm* — Mueting, Raasch & Gebhardt, P.A.

(57) ABSTRACT

According to an embodiment of the invention, there is provided a micro integratable tunable laser assembly (m-ITLA) which includes an electrical interface for interfacing with a host, a tunable laser module for conducting optical communication, and a control unit, for at least controlling operation of the tunable laser module according to information received from the host via the electrical interface. The m-ITLA can have a length of about 37 mm or less and a width of about 20 mm or less.

13 Claims, 4 Drawing Sheets

MICRO-INTEGRATABLE TUNABLE LASER ASSEMBLY

BACKGROUND OF THE INVENTION

1. Field of the Invention

The present invention relates to micro (small-size) integratable tunable laser assembly (micro-ITLA).

2. Description of the Related Art

Laser assembly is well known in the related art. Optical Internetworking Forum (OIF) has released an Integratable Tunable Laser Assembly (ITLA) Multi Source Agreement (OIF-ITLA-MSA-01.0, 2008, which can be available from http://www.oiforum.com/public/documents/OIF-ITLA-MSA-01.2.pdf) which defines numerous specifications for ITLA, including electric specifications, optical specifications, mechanical specifications, and the like.

As the developing and deploying of the optical internetworking technologies, there is a need to decrease the factor form of ITLA while still achieving the full functionality of the ITLA.

SUMMARY

According to an aspect of the present disclosure, there is provided a micro integratable tunable laser assembly (m-ITLA) which comprises: an electrical interface for interfacing with a host; a tunable laser module for irradiating a laser light; and a control unit, for at least controlling the tunable laser module according to information received from the host via the electrical interface, wherein the m-ITLA has a length of about 37 mm or less and a width of about 20 mm or less in profile.

Further aspects, features and advantages of the present invention will be understood from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present disclosure will be described in detail below with reference to the drawings. Note that similar reference numerals are used to refer to similar elements throughout the drawings, and thus repetitive descriptions thereof are omitted.

Figure 1:
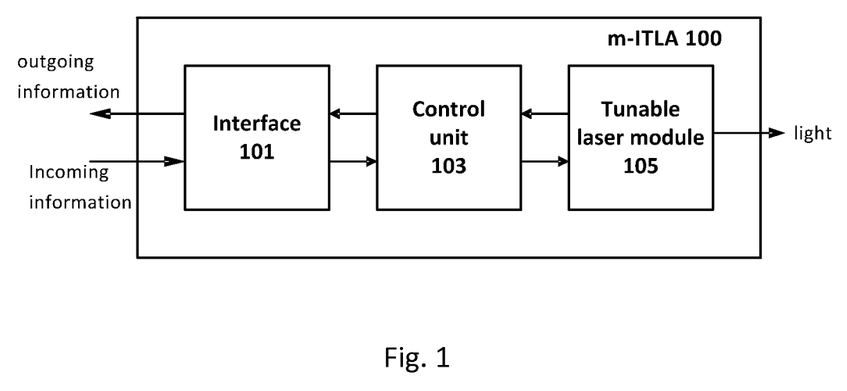
FIG. 1 is a block view schematically illustrating an embodiment of a micro integratable tunable laser assembly according to an embodiment of the present disclosure.

FIG. 1 is a block view schematically illustrating an embodiment of a micro integratable tunable laser assembly 100 according to an embodiment of the present disclosure.

The m-ITLA 100 may include an electrical interface 101 for interfacing with, for example, a host (not shown) external to the m-ITLA 100. In a preferred embodiment, the interface 101 can be implemented as, for example, RJ232 interface, Serial Peripheral Interface (SPI), or $I^2C$-Bus, which are well known in the art. With the interface 101, incoming information can be received from the host to the m-ITLA 100, and outgoing information can be transmitted from the m-ITLA 100 to the host.

The m-ITLA 100 may further include a tunable laser module 105 which can irradiate a laser light. For instance, the tunable laser module 105 can change the valid channel (e.g., change the frequency of the channel), and the module 105 can vary the optical power according to the command from the host. The tunable laser module 105 can be coupled with optical medium (e.g., an optical fibre) so that an optical communication can be conducted with, for example, external optical device (e.g., an optical receiver/transducer). Since the tunable laser module is well-known in the art, the detail description thereof would be omitted.

The m-ITLA 100 may further include a control unit 103, which can control the operation of the m-ITLA 100, and particularly, control the tunable laser module 105 according to the information received from the host via the electrical interface 101.

According to the OIF-ITLA-MSA-01.0, the host may include three layers: application layer, transport layer, and physical interface. The application layer generates command, which may preferably be encoded into a 4-byte packet. The command is formatted by the transport layer, where the error-correction bit(s) is added, for example, and then is encoded by the physical interface layer for transmission.

The ITLA/m-TILA may also include three layers: application layer, transport layer, and physical interface. The physical interface receives the incoming information from the host and decoding the information to obtain frame(s). The transport layer de-formats the frame into packet(s). For example, the transport layer checks the error-correction bit and finds there is no error occurred in transmitting, then it removes the error-correction bit so as to obtain the command packet, and then provides the command packet to the application layer. In the application layer, the command may be decoded and executed, and if necessary, a response to the command can also be prepared.

The transmission process of a response from ITLA/m-ITLA to host may be reverse to that of the command; in this regard, the response can also be deemed as a command (also referred as out-bound command, while the command from host to ITLA being referred as in-bound command) with similar format as further described below.

In a specific implementation, the incoming information may include a command (in-bound command) from the host to the assembly 100. In an example, according to the OIF-ITLA-MSA-01.0, the command may include four bytes, in which two bytes are used for data, one byte for identifying destination register, and one byte for other control. In an example, the byte for other controlling process may include one bit for specifying read or write, other bits can be utilized by transport layer for, for example, Error Correction. In an example, the Error Correction process may include checksum, and/or Cyclic Redundancy Check (CRC) which is optional. In addition, extended addressing can also be supported, so that additional memory space (22 address bits, for example) can be provided in addition to the primary 256 registers (8-bit address space)

The command from the host preferably are packed into a, for example, 4-byte packet according to OIF-ITLA-MSA-01.0, of which the lower 28 bits are used and higher 4 bits are to be defined by a transport layer. Then, the command packet can be framed into a frame and then the frame is encoded so as to be transmitted via the interface.

The outgoing information may have syntaxes similar to that of the incoming information. Generally, the outgoing information may include command/response from the laser assembly to the host. From example, the command/response packet transmitted from the laser assembly to the host may consist of a 4-byte packet of which lower 26 bits are used and higher 6 bits are reserved for transport layer use.

Figure 2:
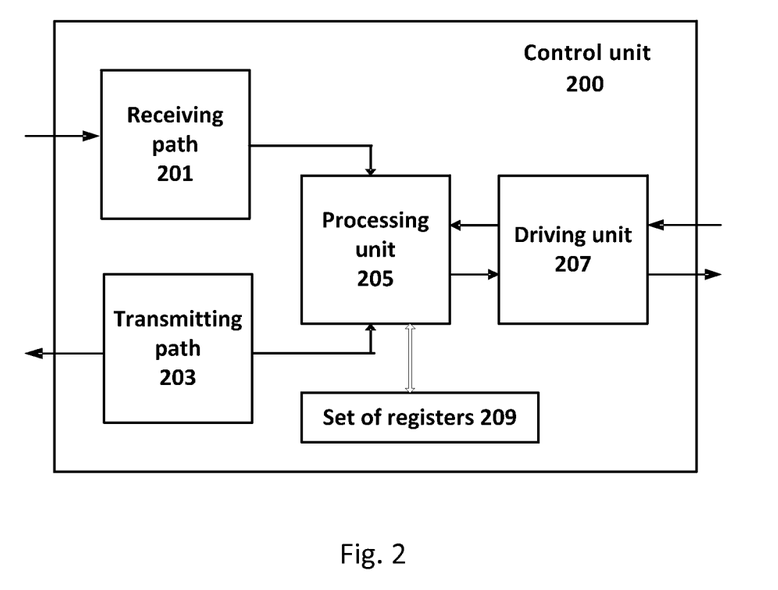
FIG. 2 is a block view schematically illustrating a control unit of micro integratable tunable laser assembly according to an embodiment of the present disclosure.

FIG. 2 schematically illustrates a block view of a control unit 200 of a micro integratable tunable laser assembly according to an embodiment of the present disclosure. The control unit 200 may include a receiving path 201 for receiving information from the electrical interface 101, and a transmitting path 203 for transmitting information to the electrical interface. The control unit 200 may further include a driving unit 207 for driving the tunable laser module 105. In an example, the driving unit 207 can provide signals to the tunable laser module so as to drive the tunable laser module so that the laser light irradiated from the tunable laser module can be tuned in accordance with the signals. The control unit 200 may further include a processing unit 205 which is adaptable for processing the information received from the receiving path, controlling the driving unit according to the information received from the receiving path to drive the tunable laser module, and obtain the information to be transmitted by the transmitting path from the processing and controlling.

In another implementation, the control unit 200 may further include a set of register(s) 209. The registers 209 can be implemented in or in addition to the processing unit 205, and can be set by the processing unit 205. At least a part of the registers 209 can be set by the processing unit according to the processing and the controlling operations thereof. Some of the registers 209 can be set by the manufacture before being shipped. The driving unit is capable of driving the tunable laser module according to contents set in one or more of the registers under the control of the processing unit. Various registers 209 are defined for the commands in OIF-ITLA-MSA-01.0, as summarized in the table 1 below which also reflects the functionalities of the corresponding commands, and thus the detail description thereof are omitted.

TABLE 1

Register Summary

| Command | Register Name | Read/Write | AEA | NV/Lock? | Description |
|---|---|---|---|---|---|
| General Module Commands | | | | | |
| 0x00 | NOP | R/W | | | Provide a way to read a pending response as from an interrupt, to determine if there is pending operation, and/or determine the specific error condition for a failed command. |
| 0x01 | DevTyp | R | AEA | | Returns device type (tunable laser source, filter, modulator, etc) as a null terminated string. |
| 0x02 | MFGR | R | AEA | | Returns manufacturer as a null terminated string in AEA mode (vendor specific format) |
| 0x03 | Model | R | AEA | | Returns a model null terminated string in AEA mode (vendor specific format) |
| 0x04 | SerNo | R | AEA | | Returns the serial number as null terminated string in AEA mode |
| 0x05 | MFGDate | R | AEA | | Returns the mfg date as a null terminated string. |
| 0x06 | FW | R | AEA | | Returns a manufacturer specific firmware release as a null terminated string in AEA mode |
| 0x07 | RelBack | R | AEA | | Returns manufacturer specific firmware backwards compatibility as a null terminated string |
| 0x08 | GenCfg | RW | | NV Lockable 2 | General module configuration |
| 0x09 | AEA-EAC | R | | | Automatic extended address configuration register |
| 0x0A | AEA-EA | R | | | Automatic extended address (16 bits) |
| 0x0B | AEA-EAR | RW | | Lockable 1 | Location accessed "thru" AEA-EA and AEA-EAC |
| 0x0C | Reserved | | | | |
| 0x0D | IOCap | RW | | NV Lockable 2 | Physical interface specific information (such as data rate, etc.) |
| 0x0E | EAC | RW | | Lockable 3 | Extended address configuration register-auto incr/decr flag on read and on write and additional address bits |
| 0x0F | EA | RW | | Lockable 3 | Extended address (16 bits) |
| 0x10 | EAR | RW | | | Location accessed "thru" EA and EAC |
| 0x11 | WCRC[22] | W | | | Asserts CRC16 for next command packet |
| 0x12 | RCRC[22] | R | | | Returns CRC16 for last response packet |
| 0x13 | LstResp | R | | | Returns last response |
| 0x14 | DLConfig | RW | | Lockable 2 | Download configuration register |
| 0x15 | DLStatus | R | | | Download status register |
| 0x16 | Lock[22] | W | AEA | | Register Lock-out Enable/Disable |
| 0x17-0x1F | Reserved | — | — | | |

TABLE 1-continued

Register Summary

| Command | Register Name | Read/Write | AEA | NV/Lock? | Description |
|---|---|---|---|---|---|
| | Module Status Commands |||||
| 0x20 | StatusF | RW | | | Contains reset status, optical faults and alarms, and enable status. |
| 0x21 | StatusW | RW | | | Contains reset status, warning optical faults and alarms, and enable status. |
| 0x22 | FPowTh | RW | | NV Lockable 2 | Returns/Sets the threshold for the output power FATAL condition encoded as ±dBm*100 |
| 0x23 | WPowTh | RW | | NV Lockable 2 | Returns/Sets the threshold for the power warning encoded as ±dBm*100 |
| 0x24 | FFreqTh | RW | | NV Lockable 2 | Returns/Sets the threshold for the frequency FATAL condition encoded as ±GHz*10 |
| 0x25 | WFreqTh | RW | | NV Lockable 2 | Returns/Sets the threshold for the frequency error warning encoded as ±GHZ*10 |
| 0x26 | FThermTh | RW | | NV Lockable 2 | Returns/Sets the threshold for thermal deviations (>± ° C.*100) at which FATAL is asserted. |
| 0x27 | WThermTh | RW | | NV Lockable 2 | Returns/Sets the threshold for thermal deviations (>± ° C.*100) at which a warning is asserted. |
| 0x28 | SRQT | RW | | NV Lockable 2 | Indicates which bits in the Fatal & Warning status registers, 0x20-0x21, cause a SRQ condition and asserts the SRQ*line. |
| 0x29 | FatalT | RW | | NV Lockable 2 | Indicates which bits in the Fatal & Warning status register, 0x20-0x21, assert a FATAL condition |
| 0x2A | ALMT | RW | | NV Lockable 2 | Indicates which bits in the status registers, 0x20, 0x21, cause an alarm condition. (Default behavior asserted whether laser is LOCKED on frequency |
| 0x2B-0x2F | Reserved | | | | |
| | Module Optical Commands |||||
| 0x30 | Channel | RW | | NV Lockable 1 | Setting valid channel causes a tuning operation to occur. |
| 0x31 | PWR | RW | | NV Lockable 1 | Sets the optical power set point as encoded as dBm*100 |
| 0x32 | ResEna | RW | | Lockable 1 | Reset/Enable-Enable output, hard and soft reset |
| 0x33 | MCB | RW | | NV Lockable 2 | Various module configurations |
| 0x34 | GRID | RW | | NV Lockable 2 | Allows the grid spacing to be set for channel numbering |
| 0x35 | FCF1 | RW | | NV Lockable 2 | Allows the first channel's frequency to be defined for channel numbering. (THz) |
| 0x36 | FCF2 | RW | | NV Lockable 2 | Allows the first channel's frequency to be defined for channel numbering. (GHz*10) |
| 0x37-0x3F | Reserved | | | | Reserved for OIF configuration registers |
| 0x40 | LF1 | R | | | Returns channel's frequency as THz |
| 0x41 | LF2 | R | | | Returns channel's frequency as GHZ*10 |
| 0x42 | OOP | R | | | Returns the optical power encoded as dBm*100 |
| 0x43 | CTemp | R | | | Returns the current temperature (monitored by the temperature alarm) encoded as ° C.*100 |
| 0x44-0x4F | Reserved | | | | Reserved for OIF status registers |
| | Module Capabilities |||||
| 0x50 | OPSL | R | | | Returns the min possible optical power setting |
| 0x51 | OPSH | R | | | Returns the max possible optical power setting |
| 0x52 | LFL1 | R | | | Laser's first frequency (THz) |
| 0x53 | LFL2 | R | | | Laser's first frequency (GHz*10) |
| 0x54 | LFH1 | R | | | Laser's last frequency (THz) |
| 0x55 | LFH2 | R | | | Laser's last frequency (GHz*10) |
| 0x56 | LGrid | R | | | Laser's minimum supported grid spacing (GHz*10) |
| | MSA Commands |||||
| 0x57 | Currents | R | AEA | | Return module specific currents |
| 0x58 | Temps | R | AEA | | Return module specific temperatures |
| 0x59 | DitherE | RW | | NV Lockable 1 | Digital dither enable    Optional features |
| 0x5A | DitherP | RW | | NV Lockable 2 | Digital dither rate |
| 0x5B | DitherF | RW | | NV Lockable 2 | Digital dither frequency modulation |

TABLE 1-continued

Register Summary

| Command | Register Name | Read/Write | AEA | NV/Lock? | Description |
|---|---|---|---|---|---|
| 0x5C | DitherA | RW | | NV Lockable 2 | Digital dither amplitude modulation |
| 0x5D | TBTFL | RW | | NV Lockable 2 | Sets the lower boundary for a warning on base of the butterfly temperature |
| 0x5E | TBTFH | RW | | NV Lockable 2 | Sets the upper boundary for a warning on base of the butterfly temperature |
| 0x5F | FAgeTh | RW | | NV Lockable 2 | Specifies the maximum end of life (EOL) percent aging at which fatal condition for the vendor specific error is asserted |
| 0x60 | WAgeTh | RW | | NV Lockable 2 | Specifies the maximum end of life (EOL) percent aging at which warning condition for the vendor specific error is asserted |
| 0x61 | Age | R | | | Returns the laser's age as a percentage |
| 0x62-0x7F | Reserved | | | | |
| | | | | Manufacturer Specific | |
| 0x80-0xFE | Manufacturer Specific | | | | |
| 0xFF | User1[23] | RW | AEA | NV Lockable 1 | User area 1-Store/retrieve user data |

A command from the host can be decoded and executed in the processing unit, and data in the command can be stored in the register specified in the command. The processing unit can control the driver to provide proper signals according to the contents (values) set in the register(s) to drive the laser module.

Figure 3:
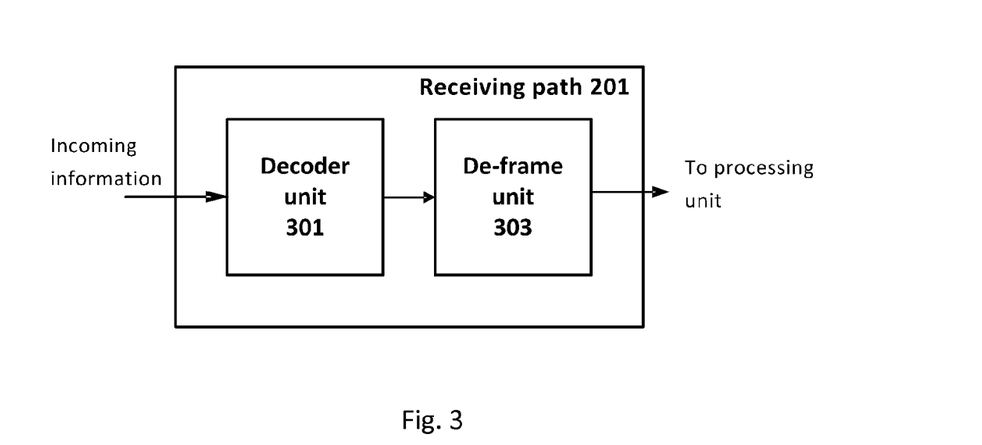
FIG. 3 is a block view schematically illustrating a receiving path according to an embodiment of the present disclosure.

FIG. 3 schematically illustrates a block view of a receiving path 201 according to an embodiment of the present disclosure. The receiving path 201 may include decoder unit 301 (corresponding to the physical interface as defined in the OIF-ITLA-MSA-01.0) which decode the incoming information from the host to frame(s). The frame(s) may be encoded at the host so as to be transmitted via the interface, for example, the command frame may be encode with one pre-pending bit and one post-pending bit in compliance with RS 232 protocol. In such a case, the decoder unit 301 may remove the pre-pending and post-pending bits from the incoming information so that a decoded frame is obtained. Then, the decoded frame is de-framed by the de-frame unit 303 (corresponding to the transport layer as defined in the OIF-ITLA-MSA-01.0) into a packet (generally, referred as command packet). In a specific implementation, the de-frame unit may check the checksum and/or CRC value contained in the frame, and remove the checksum and optional CRC bits if the checksum and/or CRC values are correct. The packet is then transmitted to the processing unit 205 (corresponding to the application layer as defined in the OIF-ITLA-MSA-01.0) for further processing including, for example, decoding and executing.

Figure 4:
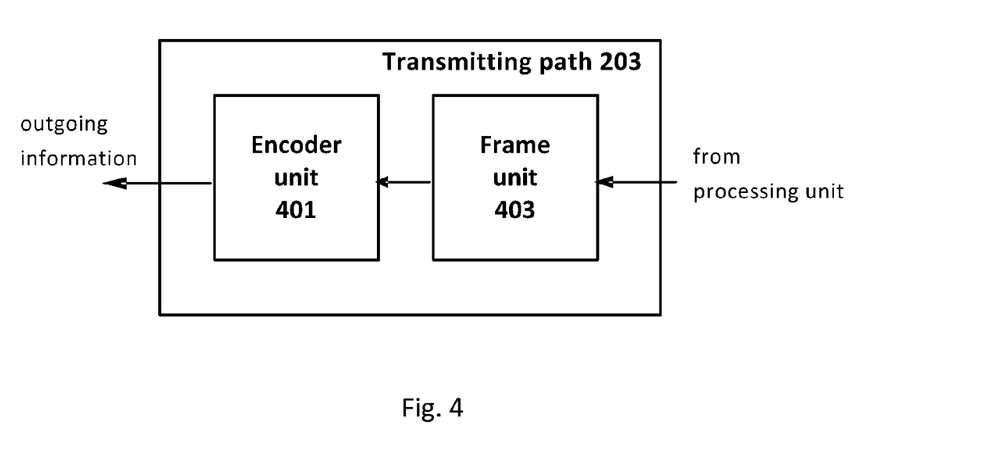
FIG. 4 is a block view schematically illustrating a transmitting path according to an embodiment of the present disclosure.

FIG. 4 schematically illustrates a block view of a transmitting path 203 according to an embodiment of the present disclosure. The transmitting path 203 may include frame unit 403 which packages the packet (command from tunable laser module to the host, or response to the command from the host) generated in the processing unit 205 into a frame. In a specific implementation, the frame unit 403 may attach a checksum bit and an optional CRC bits to the command packet so as to form a frame. The processing unit 205 may include an application layer as defined in the OIF-ITLA-MSA-01.0. Then, the frame is encoded by the encoder unit 401 depending on the interface to be employed. In the case of RS232 interface, the command frame may be encoded with one pre-pending bit and one post-pending bit in compliance with RS 232 protocol. Then the encoded frame is transmitting as outgoing information via the interface to the host.

Figure 5:
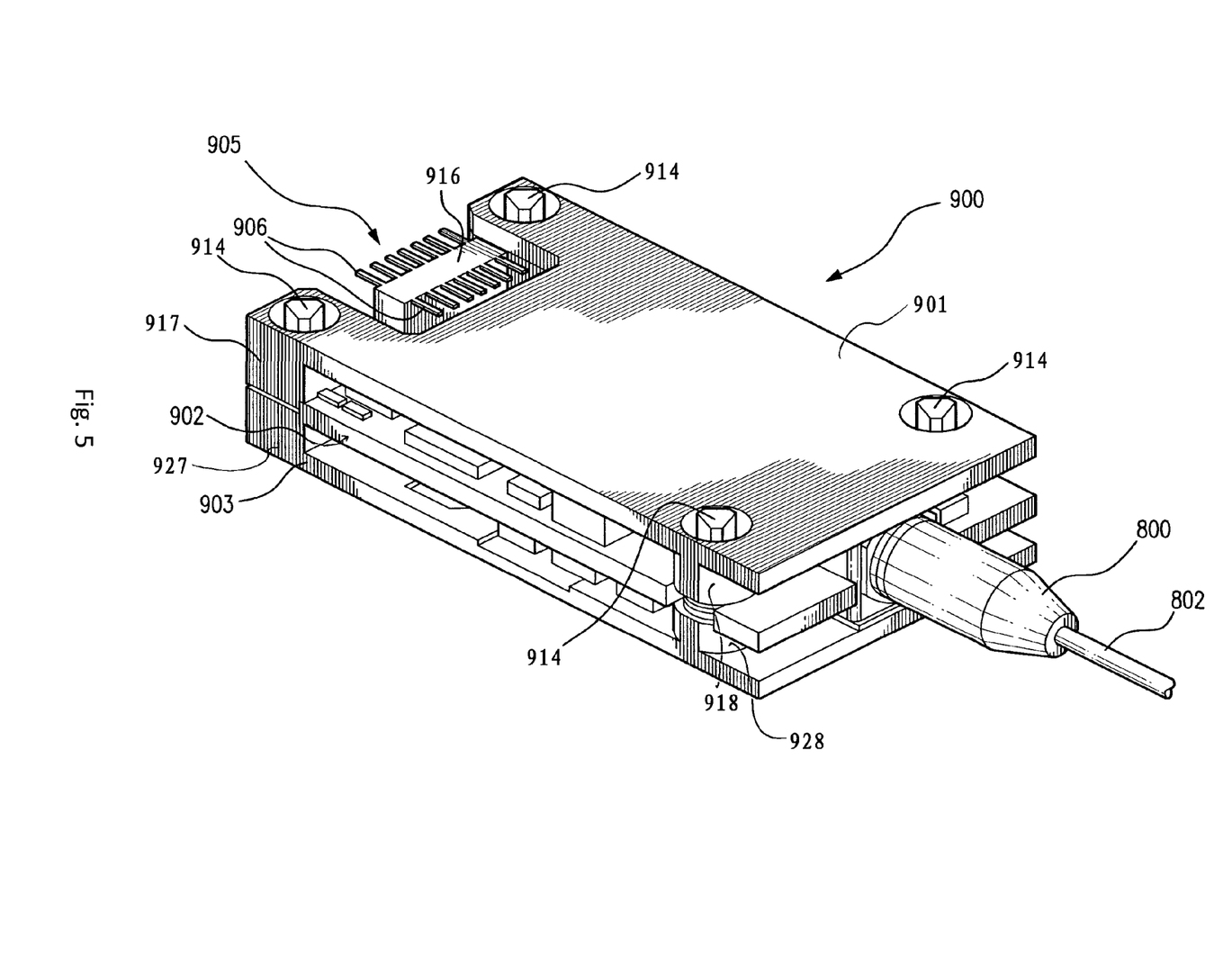
FIG. 5 is a prospective view schematically illustrating an embodiment of a laser assembly according to an embodiment of the present disclosure.

FIG. 5 is a prospective view schematically illustrating an embodiment of a laser assembly 900 according to an embodiment of the present disclosure. The assembly 900 comprises a first plate 903, a second plate 901, and a printed circuit board assembly (PBA) 902 which is adaptable to be retained between the first plate 903 and the second plate 901. In the embodiment illustrated in FIG. 5, the first plate 903 may be referred to as base plate, the second plate may be referred to as top retention plate, and the printed circuit board assembly 902 is placed over the base plate and beneath the top retention plate 901. Although the first plate 903 is illustrated as base plate in FIG. 1, the present invention is not limited thereto. For example, the first plate 903 can serve as a base plate, whereas the second plate 901 can serve as a retention plate.

Further, any of the plates 901 and 903 can be used to dissipate the heat generated from the printed circuit board assembly 902, for example, from a laser module in the PBA 902; and, in such a case, the plate can be referred to as thermal plate. In some examples, the plate(s) may be formed from, for example, metal such as aluminium (Al), copper (Cu), silver (Ag), or alloy of multiple metal elements, although other materials can be used as long as they are sufficiently firm and, in some cases, of high heat conductivity.

In an embodiment of this embodiment, the top retention plate 901 may be substantially rectangular in shape with a length of approximately 37 mm or less and a width of approximately 20 mm or less in dimension. Correspondingly, the base plate 903 may also be of the same dimensions as the retention plate.

Figure 6:
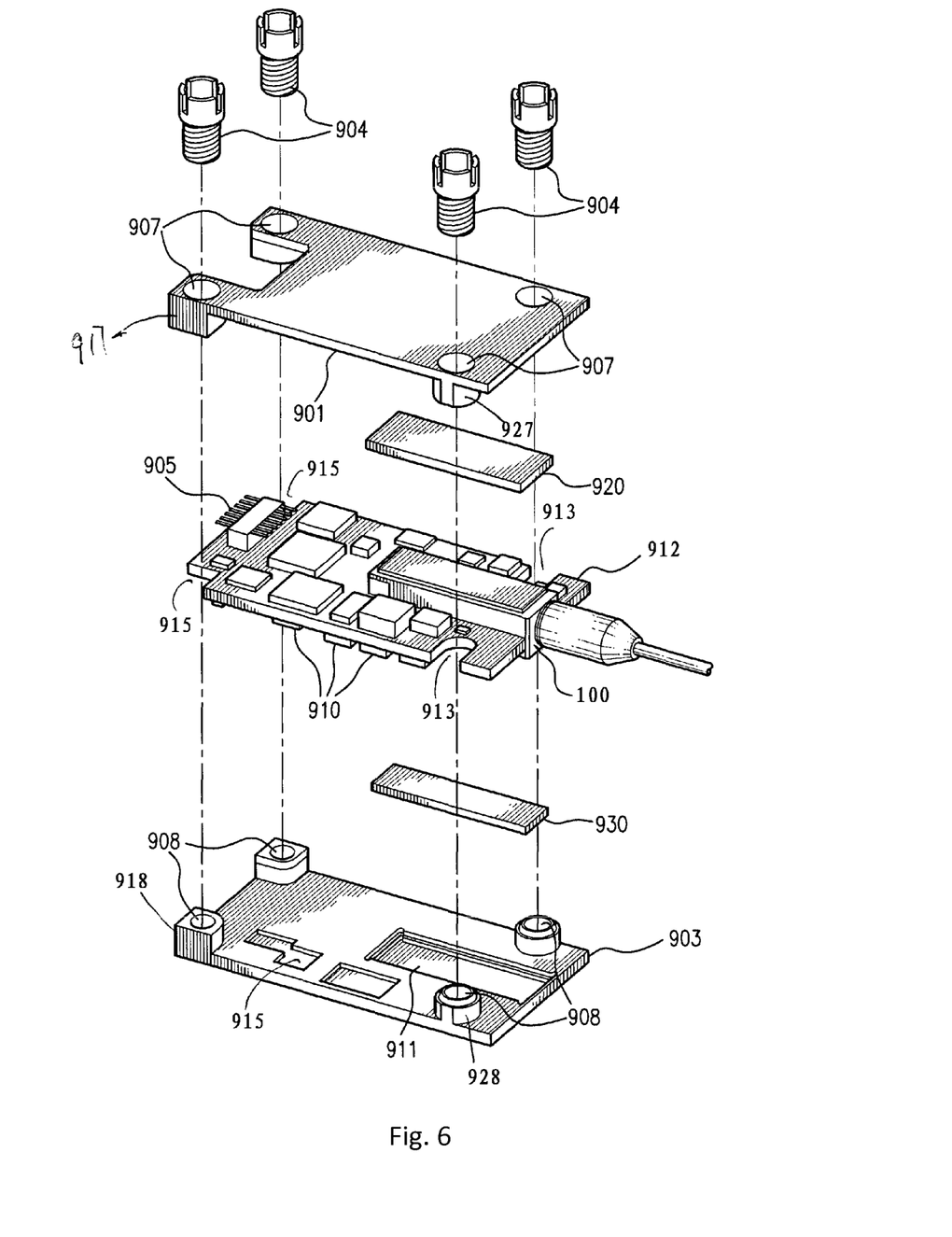
FIG. 6 schematically illustrates an explored prospective view of another embodiment of the laser assembly according to the present disclosure.

The first plate 903 may have multiple first projections 918, 928 (FIG. 6), and in this embodiment, four (4) first projections are illustrated. Each of the first projections may have a first mounting through-hole 908. Similarly, the second plate 901 may have multiple (for example, four) second projections 917, 927 (FIG. 6). In some preferred implementations, each of the second through-holes 907 is aligned with a first mounting through-hole 908. Each of the second projections may have a second mounting through-hole 907. The base plate (first plate) 903 and the top retention plate (second plate) 901 can be secured together.

As illustrated in the drawings, the printed circuit board assembly 902 is adaptable to be retained between the first plate 903 and the second plate 901 by the first projections 918, 928 and the second projections 917, 927 in the case that the first plate 903 and the second plate 901 are secured to each other. Whereas, typically posts are used for PBA retention only in the related art.

In an implementation, the printed circuit board assembly 902 includes a printed circuit board (PCB) 912 and a laser module 100 which is mounted to the printed circuit board 912. The PBA 902 may further include various other components 910, including electric components and/or optical components, etc. mounted onto the PCB 912. The printed circuit board 912 preferably is a dual-sided printed circuit board. That is to say, those components can be mounted onto double sides of the PCB and connected to the traces or pads on the bother sides, resulting in significant reduction in size of the PCB.

As illustrated in FIG. 5, the printed circuit board 912 may have first openings 913, 915 corresponding to the respective first projections 918, 928 and the respective second projections 917, 927, which can be better seen in FIG. 6.

An electrical connector 905 can also be provided on the printed circuit board 912. With the electrical connector 905, the printed circuit board assembly 902 can be electrically connected to external device, for example, CPU or other processing device, so as to receive or transmit information including command, data, etc. In this embodiment, the connector 905 is illustrated as being amounted on a surface of the PCB 912 and including an insulating base part 916 and terminals 906 extending outward from the base part 916. However, it is to be noted that various connector can be employed in the present invention. For example, connectors can be deployed on both sides of the PCB. In a further embodiment, the base part of the connector can be disposed on a surface of the PCB with row(s) of terminals extending outwards and substantially perpendicularly to the side surface.

As illustrated in FIG. 5, the plate(s) facing the connector 905, or, to say, facing the surface of the PCB on which the connector 905 is amounted, may have a cut-out for exposing the connector 905 so as to facilitate the coupling of the connector to the counterpart (e.g., a female connector). In this embodiment, the second plate 901 is illustrated as having a cut-out for exposing the connector 905, by way of example.

In addition, the entire assembly 900 may be further mounted onto an external object, such as a support, a carrier, or a heat sink (not shown) which may be at a line card of a transmitter assembly, in various manner.

In an implementation, the outer side-surfaces of the first and second projections may be flushed with the corresponding side-surface of the first and second plate, respectively, as shown in FIG. 5.

Further, as shown in FIG. 5, the laser module may further comprises a rubber bushing 800 and a optical fibre 802 extended through the bushing 800 and coupled to the laser, both of the bushing 800 and the fibre 802 can extend beyond the ends of the plates.

FIG. 6 schematically illustrates an explored prospective view of another embodiment of the laser assembly according to the present disclosure.

In this embodiment, a first pad 930 is further provided between the laser module 100 and the first plate 903, for example, over the top surface of the base plate 903 and beneath the laser module 100, as shown in the FIG. 2. Alternatively or additionally, a second pad 920 can be provided between the laser module 100 and the second plate 901, e.g., under the bottom surface of the top retention plate 901 and over the laser module 100, as shown in the FIG. 2, too.

In some cases, at least one of the first pad 930 and the second pad 920 can be compressed, and used to hold the laser module 100, or to hold the laser module 100 and to dissipate the heat from the laser module 100. In this regard, the first/second pad may also be referred to as retention and/or thermal pad. In such a case, the thermal pad may preferably be in close contact with the first or second plate. Also, in some cases, the first pad 930 and the second pad 920 can be inter-exchanged with each other. In a preferred embodiment, out of the first pad and the second pad, the one to be disposed over the laser module 100 may have a frame-like shape with an inner cut-out, that is, there can be an inner cut-out in the pad, to release the pressure impact to the cap of the laser module, resulting in improved reliability. For example, the central part of the pad to be disposed over the laser module 100 can be removed.

The first/second pad can be formed from a compressive material, such as compressive foam, compressive patty, or the like. In some embodiments, the thermal pad may have a thermal conductivity of about 7 W/mk or higher, although other values may be specified for different operational requirements. In a specific example, the laser module 100 can be TTX3 laser module, for which heat generated from the laser module will be dissipated from the bottom rather than top of the module. Accordingly, a thermal pad is used as the pad 930, whereas a retention pad can be used as the pad 920.

Further, the shape of the first/second pad can be various, depending on the shape of the laser module to be retained, although it is shown as a rectangle in this embodiment.

In some embodiments, at least one of the first plate 903 and the second plate 901 may have a recess 911, as shown in FIG. 2, for at least partly receiving the first pad or the second pad. Other recesses 915 are also shown, for at least partly receiving the components mounted on the PCB 912, if desired.

In a preferred embodiment, depth of the recess 911 can be less than the height of the first pad or the second pad to be at least partly received in the recess (911), prior to the compressing of the corresponding pad. In such a case, the laser module 100 can be supported by a surface of one out of the first plate 903 and the second plate 901 which corresponds to the recess (911), and in close contact with one out of the first pad 930 and the second pad 920 which is compressed into the recess 911, after the securing.

In another preferred embodiment, the recess 911 may comprise a first cavity and a second cavity over and adjoined to the first cavity, in which the second cavity may have in-plane dimensions larger than those of the first cavity so that a step is formed at side surfaces of the recess 911. In such an embodiment, depth of the recess 911 may be less than height of the first cavity of the corresponding one out of the first pad and the second pad, prior to being compressed. The laser module 100 can be fitted in the second cavity and supported by the step of the recess 911, and in close contact with corresponding one out of the first pad and the second pad to the recess 911, which is compressed into the first cavity of the recess 911, after the securing.

As can be seen from FIG. 6, each of the first projections 918, 928 may include a first mounting through-hole 908, each of the second projections 917, 927 may include a second mounting through-hole 907, and each of the second through-holes 907 may be aligned with a first mounting through-hole 908. The first openings 913, 915 in the PCB may be aligned with the respective first mounting through-holes and the respective second mounting through-holes, as shown.

Further, as shown in FIG. 2, the laser assembly 900 may further comprise a retention screw 904 adaptable to be screwed into at least one of the respective first mounting through-hole 908 and the respective second mounting through-hole 907, which has screw threads on the wall thereof, to secure the first plate 903 and the second plate 901. Here, the retention screw may be formed from, for example, metal such as aluminium. Needless to say, the number of the screws 904 may be corresponding to the number of the first or second mounting holes 908 or 907. In an example of this implementation, the mounting through-hole 908 of the base plate has threads on the inner surface thereof so that the retention screw 904 can be screwed into (and thus, engaged with) the mounting through-hole 908. In a further example, alternatively or additionally, the mounting through-hole 907 of the top retention plate may have threads on the inner surface thereof so that the retention screw 904 can be screwed thereto.

In some preferred embodiment, the retention screw 904 can be hollowed, that is, includes a third mounting through-hole, so that the laser assembly 900 can be mounted to an external object through the third mounting through-hole of the retention screw, as illustrated in FIG. 5. In an example, the third mounting through-hole may have no threads on the inner surface thereof, and an end-user screw may extending through the third mounting through-hole and be screwed into, for example, a mounting hole in an external heatsink.

In some implementations, the retention screw 904 may include a first (upper) portion, and a second (lower) portion having threads on an outer-surface thereof, and the first portion may have an outer diameter greater than that of the second portion. The third mounting through-hole penetrates the first portion and the second portion, longitudinally. Correspondingly, the first mounting through-hole 907 may include a first portion and a second portion, the first portion having a inner diameter greater than that of the second portion, so that the first portion of the retention screw 904 can be seated on the second portion of the first mounting through-hole 907 in the case that the first plate 903 and the second plate 901 are screwed by the retention screw 904. It may be desirable that the length (height) of the first portion of the first mounting through-hole 907 along the longitudinal axis thereof may be equal to or larger than the length (height) of the first portion of the screw 904 along the longitudinal axis thereof, so that the retention screw would not project out from the corresponding mounting through-holes. In a preferred embodiment, the retention screw 904 may include an upper portion having an inner surface of which an inner diameter is decreased from top to bottom. That is, the retention screw 904 may have an inclined inner surface in the first portion. Thus, the end-user screw/post can be fitted in the third mounting through-hole with the top of the end-user screw/post disposed flush with or below the top surface of the assembly. The retention screw 904 may further include slits extending downward from the top of the retention screw 904 and partly through the retention screw 904. The slits may facilitate the mounting of the screws.

It need to be noted that the first openings 913, 915 can be set at the positions which otherwise were used for retention hole for the PCB, as defined by the OIF-ITLA-MSA. Thus, the impact to the area of the PCB can be minimized.

Further, as can be seen from FIG. 6, the printed circuit board 912 has a second opening (cut-out) for holding the laser module 100 in the second opening, allowing the laser 100 to be mounted to the board. The second opening may preferably be formed along a symmetry axis of the printed circuit board 902, as illustrated. The width of the second opening may be approximately equal to or slightly greater than the width of the laser module 100.

In an embodiment, the laser module 100 is interconnected to the PCB 912 in a no-flex (non-flexible) manner. The top electrical pins of the laser module 100 can be soldered to traces or pads on the top side of the printed circuit board 912, and the bottom electrical pins of the laser module 100 can be soldered to traces or pads on the bottom side of the printed circuit board 902. As compared with the related art in which the golden box of the tunable laser module (TTX3, in this example) is typically retained by a separate clip to base heatsink, the impact to the usable area of the PCB can be minimized.

Moreover, at least a part of the first projections and the corresponding second projections are, respectively, arranged in proximity of edges of, or at corners of, the first plate 903 and the second plate 901. As shown, the first projections 917 and the second projections 918 are arranged at corners of the first plate 903 and the second plate 901, while the first projections 927 and the second projections 928 are arranged in proximity of edges. Those skilled in the art will readily appreciate that the projections can be arranged as needed, although being arranged at corners may be preferable.

In some further implementations, a first plurality of the first projections 917, and corresponding second projections 927 thereof, each are posts with a section view of substantial rectangle a corner of which is rounded, and a second plurality of the first projections 918, and corresponding second projections 928 thereof, each are posts including first parts and second parts adjoined to the first parts, wherein each of the second parts has a dimension less than that of the respective first part. In the example illustrated in FIG. 6, there are four first projections and four second projections. Some (two) of the four first projections, 917, each are posts with a section view of substantial rectangle a corner of which is rounded, and other two, 927, each are posts including first parts and second parts, the first part being a cylinder while the second part being a truncated taper. Similarly, some (two) of the four second projections, 918, each are posts with a section view of substantial rectangle a corner of which is rounded, and other two, 928, each are posts including first parts and second parts, the first part being a cylinder while the second part being a truncated taper.

It is to be noted that there is no particular limitation on the shapes and sizes of the openings, as long as the retention screw 904 can pass through. In a specific example as illustrated in FIG. 6, at least a part of the first openings, 915 and/or 913, are formed so that at least a portion of the side surfaces of the first openings are close to or in contact with the corresponding first projections 917 and the corresponding second projections 927 in the case that the first plate 903 and the second plate 901 are secured. However, As far, a laser assembly with small factor form is provided according to the present invention, with full functions of PBA of ITLA. Meanwhile, the impact to PBA is minimized for maximum PBA area. That is, a micro ITLA is provided according to the present invention. Further, according to the present invention, the laser module and the PBA can be secured at defined position, and have tolerance minimized to create a minimum gap between the pins of the laser module and the PCB.

Further, as above-mentioned, a pressure-defined assembling process is employed to ensure the reliability of the no-flex TTX3/PBA interconnecting in the micro ITLA.

According to another aspect of the present invention, a method for manufacturing a laser assembly is provided. A first plate 903 having first projections 918, 928 is provided. A printed circuit board assembly 902 is provided, including a printed circuit board 912 and a laser module 100 being mounted to the printed circuit board 912, and the printed circuit board 912 has first openings 913, 915. Then, a second plate 901 having second projections 917, 927 is provided. The first openings 913, 915 may be corresponding to the respective first projections and the respective second projections. And the, the first plate 903 and the second plate 901 are secured to each other so that the printed circuit board assembly 902 is retained between the first plate 903 and the second plate 901 by the first projections and the second projections.

The method may further comprise, before the securing: providing a first pad 930 between the laser module 100 and the first plate 903 and; and/or providing a second pad 920 between the laser module 100 and the second plate 901. As mentioned above, at least one of the first pad and the second pad is adaptable to hold the laser module, or to hold the laser module and to dissipate the heat from the laser module. Then, in a preferred embodiment, a force can be applied to the first plate and/or the second plate to compress the first pad and/or the second pad. At least one of the first plate 903 and the second plate 901 has a recess 911 for at least partly receiving the first pad or the second pad, the corresponding pad can be compressed into the recess 911.

In an embodiment, depth of the recess 911 may is less than the height of a corresponding pad out of the first pad and the second pad to be at least partly received in the recess 911 to be at least partly received in the recess 911, prior to the compressing of the corresponding pad. The laser module 100 can be supported by a surface of one out of the first plate and the second plate which corresponds to the recess 911, and in close contact with one out of the first pad and the second pad which is compressed into the recess 911, after the securing.

In another embodiment, the recess 911 may comprise a first cavity and a second cavity adjoined to the first cavity, the second cavity having in-plane dimensions larger than those of the first cavity so that a step is formed at side surfaces of the recess 911. The depth of the first cavity of the recess 911 may be less than height of a corresponding pad out of the first pad and the second pad to be at least partly received in the first cavity, prior to the compressing of the corresponding pad. In such a case, the laser module 100 can be fitted in the second cavity and supported by the step of the recess 911 of one out of the first plate and the second plate which corresponds to the recess 911, and in close contact with a corresponding one out of the first pad and the second pad, which is compressed into the first cavity of the recess 911, after the securing.

In a specific implementation, the securing may comprise screwing the retention screw 904 into at least one of the respective first mounting through-hole 908 and the respective second mounting through-hole 907, which has screw threads on the wall thereof, to secure the first plate 903 and the second plate 901.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, those skilled in the art will recognize that boundaries between the above described operations merely illustrative. The multiple units/operations may be combined into a single unit/operation, a single unit/operation may be distributed in additional units/operations, and units/operations may be operated at least partially overlapping in time. Moreover, alternative embodiments may include multiple instances of a particular unit/operation, and the order of operations may be altered in various other embodiments.

In the claims, the word 'comprising' or 'having' does not exclude the presence of other elements or steps then those listed in a claim. The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

The present invention can be embodied in various ways. The above described orders of the steps for the methods are only intended to be illustrative, and the steps of the methods of the present disclosure are not limited to the above specifically described orders unless otherwise specifically stated. Note that the embodiments of the present disclosure can be freely combined with each other without departing from the spirit and scope of the invention.

Although some specific embodiments of the present invention have been demonstrated in detail with examples, it should be understood by a person skilled in the art that the above examples are only intended to be illustrative but not to limit the scope of the present invention. It should be understood that the above embodiments can be modified without departing from the scope and spirit of the present invention which are to be defined by the attached claims.

What is claimed is:

1. A micro integratable tunable laser assembly (m-ITLA), characterized in that the m-ITLA comprises:
    an electrical interface for interfacing with a host;
    a tunable laser module for irradiating a laser light;
    a control unit, for at least controlling the tunable laser module according to information received from the host via the electrical interface;
    a dual-sided printed circuit board (PCB) defining first openings, wherein each of the electrical interface, the tunable laser module, and the control unit is mounted onto either side of the PCB;
    a first plate defining first projections;
    a second plate defining second projections; and
    a pad provided between the tunable laser module and at least a portion of the first and second plates, the pad being adaptable to be compressed,
    wherein the first openings are corresponding to the respective first projections and the respective second projections,
    wherein the PCB is adaptable to be retained between the first and second plates by the first and second projections when the first and second plates are secured to each other,
    wherein the pad is adaptable to hold the tunable laser module and/or to dissipate heat from the tunable laser module, and
    wherein the m-ITLA has a length of about 37 mm or less and a width of about 20 mm or less.

2. The micro integratable tunable laser assembly according to claim 1, characterized in that the control unit comprises:
- a receiving path for receiving information from the electrical interface;
- a transmitting path for transmitting information to the electrical interface;
- a driving unit for driving the tunable laser module; and
- a processing unit adaptable for processing information received from the receiving path, controlling the driving unit according to the information received from the receiving path to drive the tunable laser module, and obtaining the information to be transmitted by the transmitting path from the processing and the controlling.

3. The micro integratable tunable laser assembly according to claim 2, characterized in that the control unit further comprises:
- a set of registers, at least a part of which are capable of being set by the processing unit according to the processing and the controlling thereof,
- wherein the driving unit is capable of driving the tunable laser module according to contents set in one or more of the set of registers under the control of the processing unit.

4. The micro integratable tunable laser assembly according to claim 2, characterized in that the information received from the electrical interface comprises one or more frames, each at least including a packet carrying a command, and the information transmitted to the electrical interface comprises one or more frames, each at least including a packet carrying a response to a command.

5. The micro integratable tunable laser assembly according to claim 2, characterized in that the receiving path comprises:
- a decoder unit for decoding the received information from the electrical interface into one or more frames; and
- a de-frame unit for de-framing the one or more frames into a packet.

6. The micro integratable tunable laser assembly according to claim 2, characterized in that the transmitting path comprises:
- a frame unit for framing a packet into a frame; and
- an encoder unit for encoding the frame so as to be transmitted via the electrical interface.

7. The micro integratable tunable laser assembly according to claim 1, wherein the micro integratable tunable laser assembly has a height of about 8 mm or less.

8. The integratable tunable laser assembly according to claim 1,
- wherein said any of the first plate and the second plate has a recess for at least partly receiving the pad,
- wherein a depth of the recess is less than a height of the pad, prior to compressing of the pad, and
- wherein the tunable laser module is adaptable to be supported by a surface of said any of the first plate and the second plate, and in close contact with the pad which is compressed into the recess, after the securing.

9. The micro integratable tunable laser assembly according to claim 8,
- wherein the recess comprises a first cavity and a second cavity over and adjoined to the first cavity, the second cavity having in-plane dimensions larger than those of the first cavity so that a step is formed at side surfaces of the recess,
- wherein a depth of the first cavity of the recess is less than the height of the pad, prior to the compressing of the pad, and
- wherein the tunable laser module is adaptable to be fitted in the second cavity and supported by the step of the recess, and in close contact with the pad which is compressed into the first cavity of the recess, after the securing.

10. The micro integratable tunable laser assembly according to claim 1,
- wherein the tunable laser module is mounted to the printed circuit board in a non-flexible manner.

11. The micro integratable tunable laser assembly according to claim 1,
- wherein each of the first projections includes a first mounting through-hole, each of the second projections includes a second mounting through-hole, and each of the second mounting through-holes being aligned with each of the first mounting through-holes,
- wherein the first openings are aligned with the respective first mounting through-holes and the respective second mounting through-holes, and
- the micro integratable tunable laser assembly further comprises:
- a retention screw adaptable to be screwed into at least one of the respective first mounting through-hole and the respective second mounting through-hole which has screw threads on a wall thereof, to secure the first plate and the second plate.

12. The micro integratable tunable laser assembly according to claim 11,
- wherein the retention screw includes a third mounting through-hole so that the micro integratable tunable laser assembly is adaptable to be mounted to an external object through the third mounting through-hole of the retention screw.

13. The micro integratable tunable laser assembly according to claim 12,
- wherein the retention screw includes a first portion and a second portion having threads on an outer-surface thereof, the first portion having an outer diameter greater than that of the second portion, and the third mounting through-hole penetrates the first portion and the second portion longitudinally, and
- wherein the first mounting through-hole includes a first portion and a second portion, the first portion having an inner diameter greater than that of the second portion, so that the first portion of the retention screw can be seated on the second portion of the first mounting through-hole in the case that the first plate and the second plate are screwed by the retention screw.

* * * * *